United States Patent
Sotgiu (10) Patent No.: US 8,544,520 B2
(45) Date of Patent: Oct. 1, 2013

(54) AUTOMATIC RIM CENTERING SYSTEM FOR A TYRE CHANGING MACHINE

(75) Inventor: Paolo Sotgiu, Modena (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 231 days.

(21) Appl. No.: 13/170,866

(22) Filed: Jun. 28, 2011

(65) Prior Publication Data
US 2013/0000853 A1 Jan. 3, 2013

(51) Int. Cl.
*B60C 25/132* (2006.01)
*G05B 24/00* (2006.01)

(52) U.S. Cl.
USPC .......................... 157/1.17; 157/1.24; 356/614

(58) Field of Classification Search
USPC ....... 157/1.17, 14, 20, 1, 1.1, 1.24; 356/3.08, 356/614; 73/461
See application file for complete search history.

(56) References Cited

U.S. PATENT DOCUMENTS

| 3,918,816 | A | 11/1975 | Foster et al. |
| 5,826,319 | A * | 10/1998 | Colwell et al. ............. 29/407.04 |
| 6,615,649 | B1 * | 9/2003 | Kokubu et al. .................. 73/146 |
| 7,293,595 | B2 * | 11/2007 | Gonzaga ........................ 157/14 |

FOREIGN PATENT DOCUMENTS

| EP | 0 825 415 A2 | 2/1998 |
| EP | 2 065 230 B1 | 6/2009 |
| EP | 2 110 270 B1 | 10/2009 |

* cited by examiner

*Primary Examiner* — David B Thomas
(74) *Attorney, Agent, or Firm* — McDermott Will & Emery LLP (57) ABSTRACT

The invention concerns vehicle wheel service machines, in particular automatic tire changers, having a wheel or rim mounting device (2) which is mounted rotatably about an axis (11) and to which a wheel (1) is to be fixed. The vehicle wheel service machine comprises first and second detectors (6, 7) and a controller to detect the rotational speeds of the rim mounting device (2) and the wheel (1) respectively. Furthermore, a method for controlling the rotational speed of the rim mounting device (2) is provided. If the detected rotational speeds are different, slipping is determined and eliminated by approximating the rotational speed of the rim mounting device (2) to that of the wheel (1). A rim mounting device (2) can comprise a rim mounting plate (23) having a rim support surface (24) with a high-friction lining adapted to increase friction between the rim mounting plate (23) and the wheel (1).

15 Claims, 4 Drawing Sheets

AUTOMATIC RIM CENTERING SYSTEM FOR A TYRE CHANGING MACHINE

TECHNICAL FIELD

The invention relates to vehicle wheel service machines, in particular automatic tyre changing machines, having a wheel or rim mounting device which is mounted rotatably about an axis and to which a wheel including a tire and a wheel rim is to be fixed when fitting or removing a tyre. Furthermore, the invention relates to an improved rim mounting device and a method of controlling the rotation of a rim mounting device of such a vehicle wheel service machine.

BACKGROUND

A tyre changing machine of that kind is known from EP-patent 2 065 230 or EP-patent 2 110 270, for example. When mounting a wheel or a rim/tyre assembly on an automatic tyre changing machine in order to fit or remove a pneumatic tyre to or from a wheel rim of a motor vehicle wheel, the rim is connected to the wheel mounting device in a non-rotatable relationship therewith and in centered relationship with the axis of the wheel by fixing means, in particular clamping means such as a locking pin. A driving pin is provided at the wheel mounting device for engaging with the rim and transmitting torque and rotational motion between the wheel mounting device and the wheel. In some cases, centering and engagement is not automatically achieved by the clamping means and the driving pin, and the operator has to manually adjust the wheel or the rim respectively, or the rim/tyre assembly into the desired position.

SUMMARY OF THE INVENTION

It is an object of the present invention to improve automatic centering of a wheel onto a rim mounting device of a vehicle wheel service machine while simplifying the rim mounting device and avoiding damage or wear of the rim mounting device or delicate modern aluminum wheel rims to be mounted thereto.

In accordance with the invention, that object is solved by a vehicle wheel service machine according to claim 1 and a method according to claim 11. The dependent claims refer to further developments of the invention.

In a first aspect, the invention provides a vehicle wheel service machine, in particular a tyre changing machine, comprising rim mounting device having a rotatable shaft and a rim mounting plate connected rotationally fixed to the shaft, a motor driven via a driving circuit and adapted to drive the rotatable shaft of the rim mounting device, a first detector adapted to detect the rotational speed of the rim mounting plate, a second detector adapted to detect the rotational speed of the wheel mounted to the rim mounting plate, and a controller adapted to receive and compare output signals from the first and second detectors, wherein the controller outputs a control signal to the driving circuit of the motor to adapt the driving of the motor so that the rotational speed of the rim mounting plate and the rotational speed of the wheel are approximated to each other. Thus, occurrence of slipping between the wheel and the rim mounting plate is detected and eliminated, and therefore torque transmission is improved. In this manner a rim mounting plate can be simplified by eliminating a drive pin conventionally used to transmit torque between the rim mounting plate and the wheel while wear or damage of the wheel rim or the rim mounting plate by a troublesome rim centering operation or by a slipping between the rim and the rim mounting plate is avoided. With the present invention, automatic rim centering of a wheel onto a wheel mounting device of vehicle service machines is facilitated and improved. The service operations are accelerated while risk of damaging or wear of the service machine or the wheel rims is reduced. In this conjunction, it has to be noted that it would be sufficient for the present invention that the drive of the mounting plate is temporarily switched off.

The first detector of the vehicle wheel service machine can be a device adapted to detect the rotational speed of the motor. In this manner already existing components of a driving device of the wheel service machine can be used for providing a signal representing the rotational speed of the rim mounting plate, while the number of components and costs as well as complexity of the machine can be reduced. Alternatively, the first detector of the vehicle wheel service machine can be a device adapted to detect the rotational speed of the rim mounting plate. This is advantageous if a driving device afflicted with slip is used to drive the rim mounting plate, such as a belt drive for example.

The second detector of the vehicle wheel service machine can be an optical sensing device detecting a portion of the wheel. If the wheel service machine has optical sensing devices used for the intended operation of the service machine such as gaining geometrical data of the rim or the tyre, then these devices can advantageously be used for providing a rotational speed measurement for the rim, too. Thus, a number of components can be reduced and complexity and costs of the service machine can be kept low.

In a preferred embodiment, the second detector of the vehicle wheel service machine detects the rotational speed of the wheel by means of two sensing devices having sensing fields mutually displaced in rotational direction of the wheel, while the rotational speed of the wheel is determined using a time difference between respective detection events of a rim feature passing the sensing fields of the sensing devices. Preferably, the sensing fields of the two sensing devices are arranged within a wheel disc area of the wheel and with equal distance to a rotation axis of the wheel mounted to the rim mounting device. With this arrangement, a simple and robust detection of the rotational speed of the wheel is achieved. Optionally, the detection results of the two sensing devices can be evaluated by means of a cross-correlation of the sensor signals. This provides for a highly reliable rotational speed measurement.

In another embodiment of the invention, the second detector of the vehicle wheel service machine detects the rotational speed of the wheel by means of a sensing device arranged to sense a portion of the rim in a substantially tangential sensing direction with respect to the rotation axis of the wheel. Thus, a simple arrangement of only one additional sensor can be used, if no other existing sensing devices of the service machine are available to this purpose. The sensor can be a Doppler sensor using acoustical, optical or other electromagnetic signal beams. Other types of sensors using optical, electrical, magnetic, acoustical or mechanical principles in other geometrical arrangements can be used, too, as long as they provide a measure representing the rotational speed of the wheel.

The vehicle wheel service machine can be a tyre changer, a wheel balancer, or any other type of wheel service machine requiring rotation of the wheel mounted to a rotation shaft of the service machine.

In a preferred embodiment of the invention, a rim support surface of the rim mounting plate comprises a high-friction lining adapted to increase friction between the rim mounting plate and the wheel. With this high-friction lining used in combination with a vehicle wheel service machine according to the first aspect of the invention, occurrence of slipping can be further reduced or avoided while transmission of torque between the wheel and the rim mounting plate is advantageously improved. However, the rim mounting device comprising a high-friction lining on the rim support surface can also be used totally independently from other aspects of the present invention in order to provide for sufficient torque transmission between the rim mounting device and the wheel. Thus, a rim mounting device having such a high-friction lining independently enables elimination of the driving pin of a conventional rim mounting plate so that the rim mounting plate can be constructed with less complexity and reduced costs while a rim centering operation is simplified and accelerated, and the risk of damage or wear of the rim mounting plate or the wheel rims to be treated is reduced. It has to be noted that the high-friction lining can be used totally independent from the forgoing. Thus, it is possible to provide in particular a known vehicle service machine only with the high-friction lining without the other elements described previously in order to solve the problem mentioned above.

The high-friction lining can be a coating applied to the rim support surface of the rim mounting plate. In this case, the high-friction lining is a part of the rim mounting plate and a less number of components is required while a secure and relatively rigid and stable support of the wheel on the rim mounting device is provided. This is advantageous in particular to wheel balancers.

In another embodiment, the high-friction lining of the rim mounting device can be a separate high-friction component adapted to be arranged removable between the rim support surface of the rim mounting plate and the wheel. In this manner, an easy replacement of the high friction lining is possible.

The high-friction component according to the invention can be in positive locking engagement with the rim mounting plate so that an advantageous reliable torque transmission is provided.

In another aspect, the invention provides a method for controlling the rotational speed of a rim mounting device of a vehicle wheel service machine, in particular a tyre changing machine, comprising the steps of detecting a first rotational speed of a wheel mounted to the rim mounting device, detecting a second rotational speed of a rim mounting plate of the rim mounting device, comparing the first and second rotational speeds, determining that a slipping between the wheel and the rim mounting plate is present if the result of the comparison yields that the first and second rotational speeds are different, and if presence of slipping is determined, adapting a driving of the rim mounting plate (23) so that the first rotational speed and the second rotational speed are approximated to each other. With this method slipping between the wheel and the rim mounting plate is reliably detected and eliminated so that damaging or wear of the wheel rim or the rim mounting plate are reduced or avoided, while torque transmission is advantageously improved so that the service operations can be performed in a faster and more reliable way. In this conjunction, it has to be noted that it would be sufficient for the present invention that the drive of the mounting plate is temporarily switched off.

The set rotational speed of the rim mounting plate can be iteratively increased or decreased by a specific speed value (increment or decrement) until a desired rotational speed of the rim mounting plate corresponding to a desired rotational speed of the wheel mounted to the rim mounting plate is reached. This results in the advantage that every externally specified operation speed for the wheel is automatically achieved in a fast and reliable way.

The desired rotational speed of the rim mounting plate can be adjusted if presence of slipping is determined, so that a probability of recurrence of slipping is advantageously reduced. This further improves reliability and continuity of wheel rotation and service operation.

In a further aspect of the invention, a computer program product comprises instructions which, if executed by a processor, cause the processor to carry out a method according to the invention. Thus, the method of the invention can be implemented in already existing components, such as a controller or a motor driving circuit of the wheel service machine. In another embodiment, the method of the invention can be implemented with a wired circuit or with a separate computer-implemented controller.

A computer-readable medium can be used to carry a computer program product according to the invention. This results in the advantage that the computer program product of the invention can easily be transferred to a vehicle wheel service machine so that updates or adaptations of the method can be done in a comfortable way, for example.

BRIEF DESCRIPTION OF THE DRAWINGS

The invention will be described in greater detail by means of an exemplary embodiment with reference to the attached drawings, in which.

DETAILED DESCRIPTION

Figure 1:
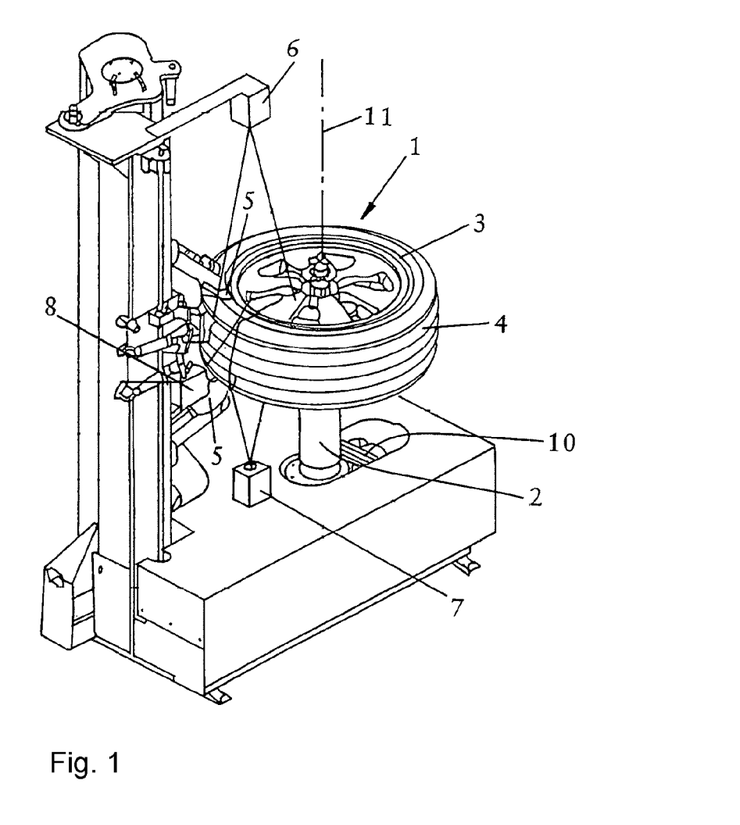
FIG. 1 shows a perspective view of a tyre changing machine according to an embodiment of the invention.

With respect to FIG. 1 showing a tyre changing machine or a tyre fitting and removing machine is described which can be used for implementing the invention. However, it has to be noted that the invention is not restricted to that kind of a tyre changer, but is applicable to any vehicle wheel service machine such as wheel balancers, for example, comprising a rotatable rim mounting device for receiving a vehicle wheel including a tyre and a wheel rim is mounted to the rim mounting device in order to perform any kind of service to the wheel.

The embodiment illustrated in FIG. 1 by way of example, comprises a wheel mounting device or rim mounting device 2 to which a rim 3 of a motor vehicle wheel 1 (rim/tyre assembly) can be fixed. A rotary drive device 10 which can be an electric motor is provided to rotate the rim mounting device 2 and the vehicle wheel 1 mounted thereon about a vertical axis 11 of the rim mounting device 2. Furthermore, tyre fitting and removing tools 5 are movably provided at a vertical frame for performing tyre fitting or removing operations.

Optical sensing devices 6, 7, 8 can be provided for sensing geometrical dimensions, positions or features of the rim 3, the tyre 4 or the wheel 1. Instead of the optical sensing devices other sensing devices which operate in a contactless mode on the basis of ultrasound or electromagnetic waves can be employed, too. The geometrical data acquired by the sensing devices 6, 7, 8 can be used to influence the operation performed by the tyre changing machine or the wheel balancer, as described in EP patent 2 110 270, for example.

Figure 2:
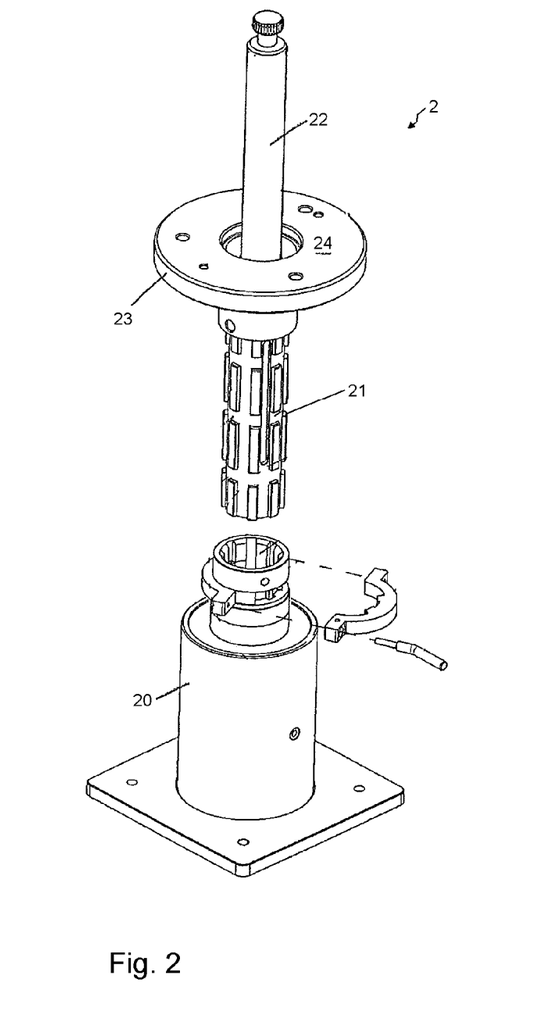
FIG. 2 shows perspective view of a rim mounting device according to an embodiment of the invention.

FIG. 2 is a perspective view of an embodiment of a rim mounting device 2 of the tyre changing machine according to the invention. The rim mounting device 2 comprises a bearing housing 20 and a rotatable shaft 21 supported in the bearing housing 20. On top of the rotatable shaft 21 a centering and clamping rod 22 is provided. The centering and clamping rod 22 is adapted to penetrate through a center hole of a wheel rim 3 and to center the wheel rim 3 or wheel 1 on a rim mounting plate 23. The shaft 21 can be driven by the rotary drive device 10 of the vehicle wheel service machine. The rim mounting plate 23 is attached rotationally fixed to the rotatable shaft 21 in a centered manner such that the centering and clamping rod 22 projects coaxially from the rim mounting plate 23. A clamping device (not shown) can be attached to the top of the centering and clamping rod 22 for clamping a rim 3 centered on the rim mounting device 2 in order to press the rim 3 or wheel 1 down onto a rim support surface 24 of the rim mounting plate 23.

It is to be noted, that the rim mounting device 2 can be arranged with a horizontal axis, too. Furthermore, it is also possible to incorporate an electric motor into the bearing housing 20 for driving the rotatable shaft 21, instead of using a separate rotary drive device 10.

The vehicle service machine according to the invention such as a tyre changer shown in FIG. 1, further comprises a motor (not shown), preferably an electric motor, arranged in a separate rotary drive device 10 or in the bearing housing 20 of the rim mounting device 2 and adapted to rotate the shaft 21 and thus the rim mounting plate 23 with the rim 3 or wheel 1 supported thereon.

Moreover, a first detector (not shown) is provided to detect the rotational speed of the rim mounting device 2 and the rim mounting plate 23, respectively. This first detector provides a first output signal representing the rotational speed of the rim mounting plate 23. In case of a three-phase motor, the first detector can be implemented as a signal generator deriving the first output signal directly from an actual driving frequency of a motor driving circuit. Since the rim mounting plate 23 is rotationally fixed to the shaft 21 and is driven by the motor via a slip-less transmission system, the rotational speed of the motor is proportional to the rotational speed of the rim mounting plate 23.

The first detector can also comprise a sensor arranged at a suitable position at the wheel service machine in order to detect the rotational speed of the motor or rotating components connected to the output shaft of the motor, such as components of a slip-less transmission system, for example. Alternatively, the sensor can directly detect the rotational speed of the rim mounting plate 23, too, in particular if a transmission system such as a belt drive afflicted with slip is used to drive the rotatable shaft 21. Such a sensor can use mechanical, optical, acoustical, electro-magnetic or other known measuring principles in order to provide the first output signal of the first detector representing the rotational speed of the rim mounting plate 23. The first signal can be an analog signal, a digital signal or a pulse repetition signal, for example.

Furthermore, a second detector is provided at a suitable position at the wheel service machine for detecting the rotational speed of the wheel 1 or rim 3 mounted to the rim mounting device 2. The second detector provides a second output signal representing the rotational speed of the wheel 1. To this purpose, one of the optical sensing devices 6, 7, 8 of the wheel service machine can be used to determine the rotational speed of the wheel 1.

This determination of the rotational speed of the wheel 1 can be accomplished in different ways. For example, the optical sensing devices 6, 7 can be arranged such that they have sensing fields mutually displaced in a rotational (circumferential) direction of the wheel 1. In other words, the sensing fields of the optical sensing devices 6, 7 are arranged in the wheel disc area of the wheel 1 with substantially equal distance to the rotation axis 11 of the wheel 1 and rotationally displaced to each other around the rotation axis 11. The rotational speed of the wheel 1 is determined using a time difference measured between respective detection events of a rim feature such as leading or trailing edges of rim spokes passing the sensing fields of the sensing devices 6, 7. The measured time difference, the known distance of the two sensing fields to the rotation axis 11 and a known distance between said two sensing fields (i.e. the angular offset of the two sensing fields with respect to the rotation axis 11) enable a suitable control device connected to the optical sensing devices 6, 7 to calculate the rotational speed of the wheel 1. The feature of the wheel 1 can be detected by measuring a contour of the wheel 1, a distance of the detected wheel surface to the optical sensing device 6, 7, or a receiving intensity (brightness) of a light beam impinging onto the wheel surface and reflected to the sensing device 6, 7.

It is also possible to use two adjacent optical sensing devices having said mutually spaced sensing fields instead of using optical sensing devices 6, 7 arranged on opposite sides of the wheel 1 as shown in FIG. 1.

Furthermore, it is possible that one and the same optical sensing device comprises a sensing field extending in rotational (circumferential) direction of the wheel 1 and repeatedly detects a feature of the wheel 1 while it is passing the sensing field. Then the rotational speed of the wheel 1 can be determined using the distance of at least two detection positions of the wheel feature within the sensing field, the distance of the detection positions to the rotation axis 11, and the time period between the respective detection events.

In order to increase reliability and accuracy of the rotational speed measurement, a correlation method can be used correlating the measuring signals provided by the two optical sensing devices. The correlation method compares two received measuring signals and calculates a cross-correlation function, a peak value of which indicates a time difference of the compared signals (i.e. a time difference of detection events of rim features passing the sensing fields). Thus, the time difference and the resulting rotational speed of the wheel 1 can be determined unambiguously and independent from complex rim designs or soiling adhering to the wheel surface. In this manner it is not necessary that a specific free area between rim spokes or the like is detected. Any wheel portion having a non-uniform surface or reflectivity is suitable to be sensed in this context.

The above described measuring principles can be applied with mechanical, acoustical or electro-magnetic sensing devices, too, and are not restricted to optical sensing devices. Furthermore, other implementations of the second detector are possible. For example, a single optical, acoustical, or radio frequency sensor utilizing the Doppler effect can be used. This Doppler sensor is arranged such that its detecting direction is oriented substantially tangentially to a circle coaxial to the wheel 1, preferably in the area of rim spokes. A geometrical feature of the rotating wheel 1 such as leading or trailing edges of rim spokes moving in a direction toward or away from the sensor will reflect an emitted signal beam to the sensor. The motion of the detected wheel feature results in a frequency shift of the signal received at the Doppler sensor proportional to the tangential speed of the feature. A control device connected to the Doppler sensor is able to calculate the rotational speed of the wheel 1 from the tangential speed and the known distance of the tangential measuring line of the Doppler sensor to the rotation axis of the wheel 1. Depending on the type of sensor, a calibration procedure may be necessary. Such a calibration procedure can be performed during a first unloaded revolution of the wheel before starting the proper service operation, for example.

Alternatively, a 2D camera can be used as the second detector to provide a sequence of 2D images of the wheel 1 or a portion of the same. By means of image processing and comparison of positions of wheel features in consecutive images of a specific time period the rotational speed of the wheel 1 can be determined.

Other implementations of the second detector are feasible. In any case, the second detector provides a second output signal representing the rotational speed of the wheel 1 mounted to the rim mounting device 2.

The vehicle wheel service machine of the invention further comprises a controller adapted to receive the first output signal of the first detector and the second output signal of the second detector. The controller compares the first and second output signals and generates based on the comparison result a control signal and outputs this control signal to the driving circuit of the motor or the rotary drive device 10 so that the rotational speed of the rim mounting device 2 is approximated to the rotational speed of the wheel 1 mounted to the rim mounting device 2.

The controller controls the rotational speed of the rim mounting device 2 such that slipping of the wheel 1 on the rim support surface 24 of the rim mounting device 2 is detected and reduced or preferably eliminated. It is an object of the controller to substantially eliminate slipping between the wheel 1 and the rim support surface 24 in order to avoid abrasion or wear of the rim 3 or the rim support surface 24. Furthermore, it is known that static friction is greater than dynamic friction. Thus, avoiding or eliminating slipping provides for an improved torque transmission between the rim mounting device 2 and the wheel 1. This is important in particular for tyre fitting machines because during tyre fitting or removing operations high torques can be applied to the rotating wheel 1 by the fitting or removing tools 5. With respect to wheel balancers, elimination of slipping between the wheel 1 and the rim mounting device 2 is advantageous since the wheel 1 can be accelerated or decelerated more quickly using higher torques applied to the wheel 1 via the rim support surface 24.

The controller can be a separate device connected to the first and second detectors and to the driving circuit controlling the motor or the rotary driving device 10. It is also possible to incorporate the controller into a control device of the vehicle wheel service machine. In this case, it is possible to implement the controller in the form of a control program running on said control device.

Figure 3:
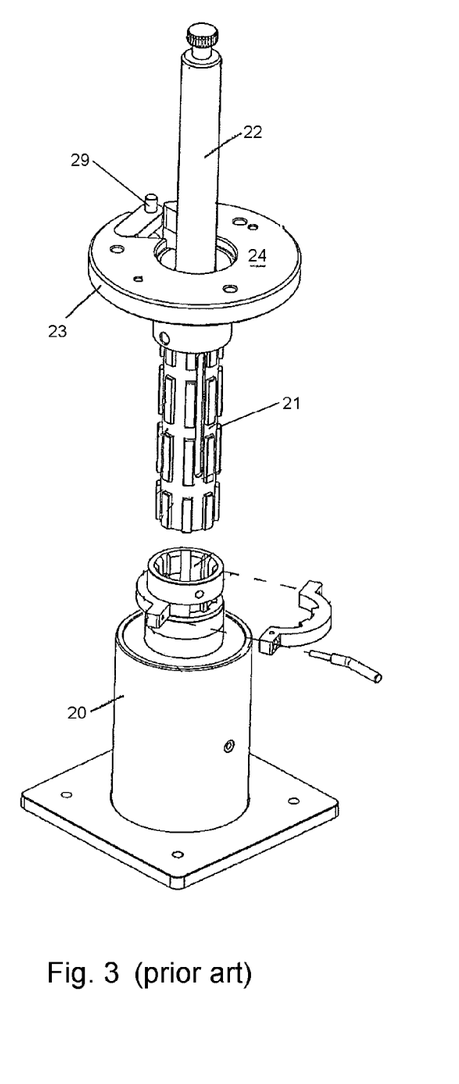
FIG. 3 shows perspective view of a rim mounting device of prior art.

With this vehicle wheel service machine according to the invention it is possible to eliminate a drive pin 29 used in a conventional rim mounting device shown in FIG. 3. This drive pin 29 is adapted to engage with a wheel bolt hole or some kind of hole or recess of a rim mounted to the rim mounting device in order to transfer torque and rotary motion from the conventional rim mounting device to a rim or wheel. While mounting a rim on the conventional rim mounting device, an operator has to check the correct engagement of the drive pin 29 with a hole or recess of the rim. If the correct engagement is not achieved automatically, the operator has to manually adjust the rim or the wheel so that correct centering and engagement of the wheel rim are achieved. This is troublesome and constitutes a permanent source of error.

The vehicle wheel service machine and the method for controlling the rotational speed of the rim mounting device of the machine (described later) according to the present invention eliminate the need for such a drive pin and simplify the operation of mounting a wheel 1 or rim 3 onto the rim mounting device 2 of a vehicle wheel service machine. With the present invention, a wheel 1 or rim 3 only has to be set onto the rim support surface 24 of the rim mounting plate 23 with the centering and clamping rod 22 penetrating through the center hole of the rim 3. Then a suitable clamping device has to be attached to the centering and clamping rod 22 and has to be tightened in order to finally center and clamp the wheel rim 3 onto the rim mounting device 2, thereby providing for a sufficient clamping force pressing the rim 3 or wheel 1 onto the rim support surface 24. Thus, a sufficient friction and torque transmission between the rim mounting device 2 and the wheel 1 is automatically achieved. The strength of the clamping force depends on the particular type of operation which is intended to be performed by the wheel service machine. For example, a tyre changing machine requires a stronger clamping force than a wheel balancer, since the torques applied from tyre fitting or removing tools to the tyre/rim assembly during a service operation are higher than the acceleration and deceleration torques occurring during a wheel balancer operation.

Thus, the friction and torque transmission achieved by a typical steel surface 24 of a rim mounting plate 23 is sufficient for wheel balancers, for example. The torques required for accelerating or decelerating the wheel can be achieved with moderate clamping forces and usual friction surfaces of steel and aluminum.

However, tyre fitting and removing machines, for example, require relative high torques during the fitting or removing operation. This requires very strong clamping forces applied by the clamping device. In order to mitigate the clamping force requirements and enhance the friction and torque transmission between the wheel 1 and the rim mounting plate 23, a rim support surface 24 having a higher friction coefficient can be used.

In a preferred embodiment of the invention, the rim support surface 24 of the rim mounting device 2 is provided with a high-friction lining adapted to increase the friction between the rim mounting plate 23 and the wheel rim 3 or wheel 1 supported thereon. This high-friction lining serves to improve transmission of torque and rotary motion of the shaft 21 via the rim mounting plate 23 to the wheel 1 which is pressed onto the high-friction lining by means of the clamping device in order to rotate the wheel 1.

The high-friction lining provided on the rim support surface 24 can comprise a rubber material or any other high-friction material suitable to substantially increase the friction between the plate 23 and the wheel 1. The high-friction lining can be a long-lasting coating which is inseparably applied to the support surface 24 of the rim mounting plate 23.

The high-friction material preferably provides a very high friction to steel, coated steel, and coated or uncoated aluminum alloys as usually employed for vehicle wheel rims. Preferably, the high friction material is relatively soft and does not abrade or damage the rim surface if the rim is slipping on the rim support surface. On the other hand, the high-friction material of the high-friction lining is preferably not too weak so that the position of the wheel 1 on the rim mounting device 2 does not substantially vary during operation of the wheel service machine. For example, a high-friction material used in a wheel balancer should be more stable and harder than that used in a tyre changer, because measuring of unbalance of a wheel requires undamped transmission of unbalance forces via a relatively inelastic connection between the wheel 1 and the rim mounting plate 23.

As already mentioned above, a weak high-friction lining is not absolute necessary in a wheel balancer according to the present invention, so that a usual steel surface 24 of a rim mounting plate 23 provides for sufficient friction and simultaneously for a sufficiently rigid connection to the wheel 1.

In another embodiment of the invention, the high-friction lining can be a separate component such as a rubber disc which is positioned removable between the rim mounting plate 23 and the rim 3 of a wheel 1 mounted on the rim mounting device 2. It is also possible that the high-friction lining is a coating of a separate high-friction plate formed from metal or plastic, for example, and being positioned removable between the rim mounting plate 23 and the wheel 1. Providing a separate high-friction lining component results in the advantage that the high-friction lining can easily be replaced if it decreases in its performance because of accumulation of dirt on its surface or because of wear during hard operation in typical garage environments. Thus, it is not necessary to replace the whole rim mounting plate 23 what would be more expensive and laborious.

Torque transmission between the rim mounting plate 23 and the separate high-friction component (provided in the form of a rubber disc or a high-friction plate having the high-friction lining) can be provided by a positive locking engagement of the high-friction component with the rim mounting plate 23. This positive locking engagement can be provided in the form of projections formed on the lower side (the side facing to the rim mounting plate 23) of the separate high-friction component and engaging in corresponding holes or recesses formed in the upper side of the rim mounting plate 23. However, torque trans-mission between the high-friction component and the rim mounting plate 23 can be provided by another high-friction material arranged on the lower surface of the high-friction component without requiring a positive locking engagement. This high-friction material can be the same as that provided on the rim support surface 24, or can be of a different type.

Friction and torque transmission between the rim support surface 24 and the wheel 1 can be increased by providing the high-friction lining of the rim support surface 24 with a profiled surface. However, a plane high-friction lining surface may provide for a sufficient friction and torque transmission, too.

In some cases, the high-friction lining of the rim support surface 24 according invention can provide for a sufficient torque transmission from the rim mounting device 2 to the wheel 1 so that the first and second detectors and the controller described above as well as the method of controlling the rotational speed of the rim mounting device 2 described in the following are not absolutely necessary. In other words, the rim mounting device 2 of the present invention having the high-friction lining on the rim support surface 24 can be used as a stand-alone solution in order to improve automatic centering of a wheel or rim onto a rim mounting device 2 of a vehicle wheel service machine so that the rim mounting plate 23 can be simplified and the drive pin 29 of a conventional rim mounting plate can be eliminated. This applies in particular to wheel balancers or other vehicle wheel service machines applying relative low torques to the wheel 1.

Figure 4:
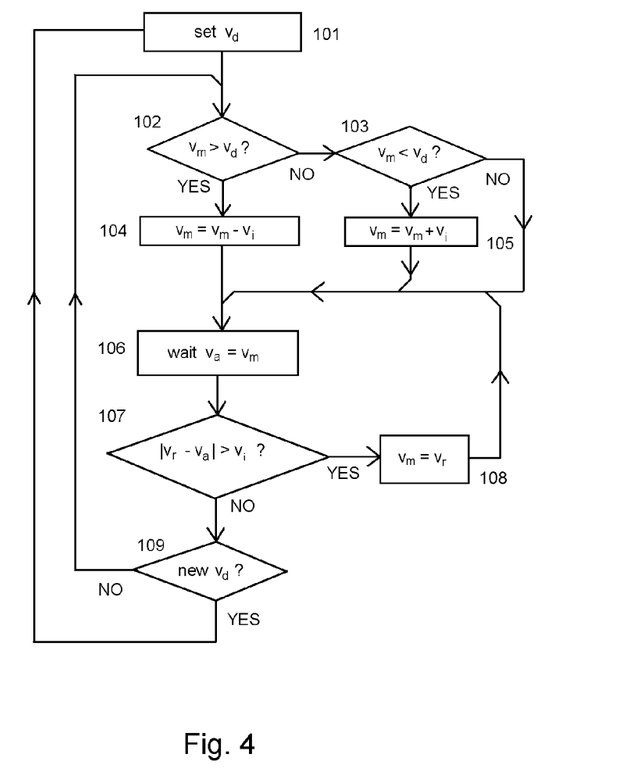
FIG. 4 shows a flow diagram of a method according to the present invention.

In the following a method of controlling the rotational speed of a rim mounting device according to the invention is described with respect to FIG. 4. The method described is only an example for possible implementations of the method and is not restricted to the shown steps or to the shown diagram. Other implementations providing for the same effect in the sense of the invention are feasible.

In step 101, a desired rotational speed $v_d$ (operating speed) of the wheel 1 or rim 3 is set. Then, in step 102, it is determined whether a set rotational speed $v_m$ of the mounting plate 23 (such as a corresponding set frequency of a motor driving circuit in case of a three-phase motor) is higher than the desired rotational speed $v_d$ of the wheel 1, what corresponds to a desired deceleration of the rim mounting plate 23 and the wheel 1, respectively. If the determination result of step 102 is YES, the procedure continues with step 104 decreasing the rotational speed $v_m$ of the mounting plate 23 by a speed value $v_i$, thus providing for the desired deceleration of the mounting plate 23. After step 104 the procedure goes to step 106.

If the determination result of step 102 is NO, the procedure continues with step 103 determining whether a set rotational speed $v_m$ of the mounting plate 23 is lower than $v_d$, what corresponds to a desired acceleration of the rim mounting plate 23 and the wheel 1, respectively. If the determination result of step 103 is YES, the procedure continues with step 105 increasing the rotational speed $v_m$ by the speed value $v_i$, thus providing for an acceleration of the mounting plate 23. After step 105 the procedure goes to step 106.

If the determination result in step 103 is NO, then the set rotational speed $v_m$ is equal to the desired rotational speed $v_d$, what means that the desired operational speed of the rim mounting plate 23 has been reached and has to be hold. In this case, the procedure continues with step 106.

In this manner, the set rotational speed $v_m$ of the rim mounting plate 23 is increased or decreased by using a speed ramp, until the desired rotational speed is achieved.

In step 106, the procedure waits until a measured actual rotational speed $v_a$ of the rim mounting plate 23 (corresponding to the first output signal provided by the first detector) is equal to the set rotational speed $v_m$ of the same. In another embodiment of the method it is also possible to wait for a specified time period which is typically required for the drive of the rim mounting plate 23 to achieve the set speed $v_m$.

Then, in step 107, the procedure determines whether an absolute value of a difference $|v_r-v_a|$ between a measured rotational speed $v_r$ of the wheel 1 (corresponding to the second output signal of the second detector) and the measured actual rotational speed $v_a$ of the mounting plate 23 is greater than a tolerance value. In this example, the accelerating/decelerating speed value $v_i$ is taken as tolerance value. The tolerance value represents the maximum measured slipping speed which is considered allowable. Preferably, the tolerance value is set to the smallest value not allowing the typical measuring errors of the whole system to trigger an erroneous determination of slipping. If the absolute value of said speed difference $|v_r-v_a|$ exceeds the tolerance value $v_i$, i.e. the determination result in step 107 is YES, then the procedure goes to step 108. Else, the procedure continues with step 109.

In step 108, the set rotational speed $v_m$ of the mounting plate 23 is set to the measured actual rotational speed $v_r$ of the wheel 1 in order to adapt the actual rotational speed of the rim mounting plate 23 to the actual rotational speed of the wheel 1 and to eliminate slipping. After step 108, the procedure goes to step 106, where the procedure waits until the measured actual rotational speed $v_a$ of the rim mounting plate 23 will be equal to the set rotational speed $v_m$ of the same and the detected slipping between the wheel 1 and the mounting plate 23 will have been eliminated.

Alternatively or simultaneously, in step 108, the driving of the rim mounting plate can be switched off in order to eliminate slipping. Thereafter, the procedure will proceed with the waiting step 106. The friction between the wheel 1 and the rim mounting plate 23 will automatically provide for reduction of the speed difference to zero in a short time period. This is a simple and fast method to approximate the rotational speeds of the rim mounting plate 23 and the wheel 1. Other measures for approximating the actual rotational speeds of the rim mounting plate 23 and the wheel 1 are feasible, such as using some kind of brake. It is only important that the speed difference and thus the slipping is reduced or eliminated, respectively.

In step 109, the procedure determines whether a new desired speed $v_d$ has been requested, for example by a superior controller or a user of the vehicle wheel service machine. If the determination result in step 109 is YES, then the procedure goes back to step 101. Else, the procedure continues with step 102. Thus, a continuous control of the rotational speed of the wheel 1 or rim 3 and the rotational speed of the rim mounting plate 23 of the rim mounting device 2 which avoids or eliminates slipping is provided.

In a further embodiment of the invention it is also possible to adjust the desired rotational speed $v_d$ (operation speed) of the rim mounting device 2 or the accelerating/decelerating speed value $v_i$ after a slipping has occurred in order to avoid recurrence of slipping. This is because such an adjustment of the desired rotational speed of the rim mounting device 2 results in a decrease of the torque applied to wheel 1 during a tyre fitting or removing operation or during angular acceleration or deceleration of the wheel 1.

The method of the invention can be implemented by a wired circuit or by a computer program product causing a computer, for example a controller of the vehicle service machine, to carry out the method steps described above.

A computer-readable medium can be used to carry or store the computer program product according to the present invention. The medium can be a memory circuit, a magnetic or optical data storage device, or a transmission medium like an internet connection or a wireless transfer line between hardware components. Any kind of medium suitable to store or transfer data can be used.

The invention claimed is:

1. A vehicle wheel service machine, in particular a tyre changing machine, comprising:
    a rim mounting device (2) having a rotatable shaft (21) and a rim mounting plate (23) connected rotationally fixed to the shaft (21),
    a motor driven via a driving circuit and adapted to drive the rotatable shaft (21) of the rim mounting device (2),
    a first detector adapted to detect the rotational speed of the rim mounting plate (23),
    a second detector adapted to detect the rotational speed of a wheel (1) mounted to the rim mounting plate (23), and
    a controller adapted to receive and compare output signals from the first and second detectors, wherein the controller outputs a control signal to the driving circuit of the motor to adapt the driving of the motor so that the rotational speed of the rim mounting plate (23) and the rotational speed of the wheel (1) are approximated to each other.

2. The vehicle wheel service machine according to claim 1, wherein the first detector is a device adapted to detect the rotational speed of the motor.

3. The vehicle wheel service machine according to according to claim 1 or 2,
    wherein the second detector detects the rotational speed of the wheel (1) by means of two sensing devices (6, 7) having sensing fields mutually displaced in rotational direction of the wheel (1), and
    the rotational speed of the wheel (1) is determined using a time difference between respective detection events of a wheel feature passing the sensing fields of the sensing devices (6, 7).

4. The vehicle wheel service machine according to claim 3, wherein the second detector detects the rotational speed of the wheel (1) by means of a cross-correlation of the output signals of said sensing devices (6, 7).

5. The vehicle wheel service machine according to claim 1 or 2,
    wherein the second detector detects the rotational speed of the wheel (1) by means of a sensing device arranged to sense a portion of the wheel (1) in a substantially tangential sensing direction with respect to the rotation axis (11) of the wheel (1) based on the Doppler effect.

6. The vehicle wheel service machine according to claim 1 or 2,
    wherein the machine is one of a tyre changer and a wheel balancer.

7. The vehicle wheel service machine according to claim 1 or 2,
    wherein a rim support surface (24) of the rim mounting plate (23) comprises a high-friction lining adapted to increase friction between the rim mounting plate (23) and the wheel (1).

8. The device according to claim 7,
    wherein the high-friction lining is a coating applied to the rim support surface (24) of the rim mounting plate (23).

9. The device according to claim 7,
    wherein the high-friction lining is a separate high-friction component adapted to be arranged removable between the rim support surface (24) of the rim mounting plate (23) and the wheel (1).

10. The device according to claim 9,
    wherein the high-friction component is in positive locking engagement with the rim mounting plate (23).

11. A method for controlling the rotational speed of a rim mounting device of a vehicle wheel service machine, in particular a tyre changing machine, comprising the steps of:
    detecting a first rotational speed of a rim mounting plate (23) of the rim mounting device (2),
    detecting a second rotational speed of a wheel (1) mounted to the rim mounting device (2),
    comparing the first and second rotational speeds,
    determining that a slipping between the wheel (1) and the rim mounting plate (23) is present if the result of the comparison yields that the first and second rotational speeds are different, and,
    if presence of slipping is determined, adapting a driving of the rim mounting plate (23) so that the first rotational speed and the second rotational speed are approximated to each other.

12. The method according to claim 11,
    wherein the set rotational speed of the rim mounting plate (23) is iteratively increased or decreased by a specific speed value until a desired rotational speed of the rim mounting plate (23) corresponding to a desired rotational speed of the wheel (1) mounted to the rim mounting plate (23) is reached.

13. The method according to claim 11 or 12,
    wherein the desired rotational speed of the rim mounting plate (23) is adjusted if presence of slipping is determined, so that a probability of recurrence of slipping is reduced.

14. A computer program product comprising instructions which, if executed by a processor, cause the processor to carry out a method according to claim 11 or 12.

15. A computer-readable medium carrying a computer program product according to claim 14.

* * * * *